United States Patent
Kim et al.

(10) Patent No.: US 9,438,403 B2
(45) Date of Patent: *Sep. 6, 2016

(54) METHOD AND APPARATUS FOR TRANSMITTING A REFERENCE SIGNAL IN A WIRELESS COMMUNICATION SYSTEM

(71) Applicant: LG ELECTRONICS INC., Seoul (KR)

(72) Inventors: Min Gyu Kim, Anyang-si (KR); Suck Chel Yang, Anyang-si (KR); Joon Kui Ahn, Anyang-si (KR); Dong Youn Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/728,770

(22) Filed: Jun. 2, 2015

(65) Prior Publication Data

US 2015/0263843 A1   Sep. 17, 2015

Related U.S. Application Data

(63) Continuation of application No. 13/696,027, filed as application No. PCT/KR2011/003288 on May 3, 2011, now Pat. No. 9,065,649.

(60) Provisional application No. 61/330,886, filed on May 4, 2010, provisional application No. 61/364,792, filed on Jul. 15, 2010, provisional application No. 61/367,848, filed on Jul. 26, 2010.

(51) Int. Cl.
*H04W 4/00* (2009.01)
*H04L 5/00* (2006.01)
(Continued)

(52) U.S. Cl.
CPC ........... *H04L 5/0055* (2013.01); *H04L 1/1812* (2013.01); *H04L 1/1861* (2013.01); *H04L 5/0048* (2013.01); *H04L 27/26* (2013.01); *H04L 27/2613* (2013.01)

(58) Field of Classification Search
CPC .. H04L 1/1861; H04L 5/0055; H04L 27/2613
USPC ........ 370/328–329, 335, 342–343, 437, 441, 370/465–466, 474, 476, 479–480, 204, 206, 370/207–208
See application file for complete search history.

(56) References Cited

U.S. PATENT DOCUMENTS 7,729,237 B2   6/2010   Lee et al.
8,077,693 B2   12/2011  Zhang et al.
(Continued)

FOREIGN PATENT DOCUMENTS

CN       101384055 A    3/2009
KR   10-2009-0030242 A  3/2009
(Continued)

*Primary Examiner* — Kevin Mew
(74) *Attorney, Agent, or Firm* — Birch, Stewart, Kolasch & Birch, LLP

(57) ABSTRACT

A method of transmitting a reference signal in a wireless communication system; and a user equipment therefore are described. The method according to one embodiment includes selecting one or more values among a set {0, 3, 6, 8, 10}; cyclically shifting a base sequence based on the one or more values selected from the set {0, 3, 6, 8, 10}; and transmitting the reference signal based on the cyclically shifted base sequence to a base station. The reference signal is transmitted on a first orthogonal frequency division multiplexing (OFDM) symbol and a second OFDM symbol. The first OFDM symbol is a second OFDM symbol among 7 OFDM symbols in one slot. The second OFDM symbol is a sixth OFDM symbol among the 7 OFDM symbols in the slot.

12 Claims, 11 Drawing Sheets

(51) Int. Cl.
 *H04L 1/18* (2006.01)
 *H04L 27/26* (2006.01)

(56) References Cited

U.S. PATENT DOCUMENTS

| | | | |
|---|---|---|---|
| 8,634,369 B2 | 1/2014 | Ahn et al. | |
| 9,160,514 B2* | 10/2015 | Chung | H04L 5/0092 |
| 2008/0316957 A1* | 12/2008 | Shen | H04J 13/00 |
| | | | 370/328 |
| 2009/0092148 A1 | 4/2009 | Zhang et al. | |
| 2009/0109906 A1 | 4/2009 | Love et al. | |
| 2009/0181692 A1* | 7/2009 | Gaal | H04J 13/16 |
| | | | 455/452.2 |
| 2009/0231993 A1* | 9/2009 | Zhang | H04L 1/1671 |
| | | | 370/210 |
| 2009/0252260 A1 | 10/2009 | Noh et al. | |
| 2009/0268685 A1* | 10/2009 | Chen | H04L 1/1854 |
| | | | 370/329 |
| 2009/0290538 A1* | 11/2009 | Kim | H04J 13/0074 |
| | | | 370/328 |
| 2010/0034312 A1* | 2/2010 | Muharemovic | H04L 27/2613 |
| | | | 375/267 |
| 2010/0165882 A1* | 7/2010 | Palanki | H04W 8/005 |
| | | | 370/254 |
| 2010/0182898 A1* | 7/2010 | Li | H04J 11/005 |
| | | | 370/208 |
| 2010/0284394 A1 | 11/2010 | Takata et al. | |
| 2011/0110246 A1* | 5/2011 | Damnjanovic | H04L 1/0028 |
| | | | 370/252 |
| 2011/0126071 A1 | 5/2011 | Han et al. | |
| 2011/0170489 A1 | 7/2011 | Han et al. | |
| 2011/0183609 A1* | 7/2011 | Noh | H04L 5/0016 |
| | | | 455/39 |
| 2011/0243066 A1 | 10/2011 | Nazar et al. | |
| 2011/0286548 A1 | 11/2011 | Safavi et al. | |
| 2012/0039278 A1 | 2/2012 | Park et al. | |
| 2012/0082145 A1* | 4/2012 | Chen | H04L 1/0029 |
| | | | 370/338 |
| 2012/0170533 A1 | 7/2012 | Ahn et al. | |
| 2012/0207123 A1* | 8/2012 | Seo | H04L 1/1861 |
| | | | 370/329 |
| 2012/0213196 A1 | 8/2012 | Chung et al. | |
| 2013/0010721 A1 | 1/2013 | Aiba et al. | |
| 2013/0010742 A1 | 1/2013 | Han et al. | |
| 2013/0094463 A1 | 4/2013 | Mahalleh et al. | |
| 2013/0242822 A1 | 9/2013 | Yang et al. | |
| 2014/0029554 A1 | 1/2014 | Ahn et al. | |

FOREIGN PATENT DOCUMENTS

KR 10-2009-0111271 A 10/2009
KR 10-2010-0019953 A 2/2010

\* cited by examiner (A)

(B)

(A)

(B)

(A)

(B)

(C)

METHOD AND APPARATUS FOR TRANSMITTING A REFERENCE SIGNAL IN A WIRELESS COMMUNICATION SYSTEM

CROSS REFERENCE TO RELATED APPLICATIONS

This application is a Continuation of co-pending application Ser. No. 13/696,027 filed on Nov. 2, 2012, which is a National Stage of PCT/KR2011/003288 filed on May 3, 2011, which claims the benefit of Provisional Application Nos. 61/330,886 filed on May 4, 2010, 61/364,792 filed on Jul. 15, 2010 and 61/367,848 filed on Jul. 26, 2010. The entire contents of each of these applications are hereby incorporated by reference in their entirety.

BACKGROUND OF THE INVENTION

1. Field of Disclosure

The present invention relates to wireless communications, and more particularly, to a method and apparatus for transmitting a reference signal in a wireless communication system.

2. Description of the Related Art

Long term evolution (LTE) based on $3^{rd}$ generation partnership project (3GPP) technical specification (TS) release 8 is a promising next-generation mobile communication standard.

As disclosed in 3GPP TS 36.211 V8.7.0 (2009-05) "Evolved Universal Terrestrial Radio Access (E-UTRA); Physical Channels and Modulation (Release 8)", a physical channel of the LTE can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

The PUCCH is an uplink control channel used for transmission of uplink control information such as a hybrid automatic repeat request (HARQ) positive-acknowledgement (ACK)/negative-acknowledgement (NACK) signal, a channel quality indicator (CQI), and a scheduling request (SR).

Meanwhile, 3GPP LTE-advanced (A) which is an evolution of 3GPP LTE is under development. Examples of techniques employed in the 3GPP LTE-A include carrier aggregation and multiple input multiple output (MIMO) supporting four or more antenna ports.

The carrier aggregation uses a plurality of component carriers. One uplink component carrier and one downlink component carrier are mapped to one cell. When a user equipment receives a service by using a plurality of downlink component carriers, it can be considered that the user equipment receives the service from a plurality of serving cells.

With the introduction of the carrier aggregation and the MIMO, it is required to increase capacity of a control channel. The increase in the number of downlink transport blocks that can be transmitted in one transmission time interval (TTI) results in the increase in the number of bits of an HARQ ACK/NACK signal for the downlink transport blocks. For example, if 8 downlink transport blocks are transmitted, it is necessary to transmit an 8-bit HARQ ACK/NACK signal.

Since the conventional PUCCH structure is designed on the basis of a 2-bit HARQ ACK/NACK signal, it is required to design a PUCCH for carrying an HARQ ACK/NACK signal having the increased number of bits.

In addition, a channel needs to be designed such that it does not affect detection performance of control information on the PUCCH even if capacity is increased.

SUMMARY OF THE INVENTION

The present invention provides a method and apparatus for transmitting a reference signal used in demodulation of uplink control information.

The present invention also provides a method and apparatus for performing hybrid automatic repeat request (HARQ) by using increased channel capacity.

In an aspect, a method of transmitting a reference signal in a wireless communication system is provided. The method includes generating a length-12 base sequence for the reference signal, determining a cyclic shift index selected from a cyclic shift index set {0, 3, 6, 8, 10}, generating a cyclically shifted sequence by cyclically shifting the base sequence on the basis of the cyclic shift index and transmitting the cyclically shifted sequence to a base station.

The method may further include receiving, from the base station, a resource index used to determine the cyclic shift index.

The method may further include receiving, from the base station, a resource configuration including information regarding a plurality of resource index candidates. The resource index may be one of the plurality of resource index candidates.

The reference signal may be used to demodulate a hybrid automatic repeat request (HARQ) positive-acknowledgement (ACK)/negative-acknowledgement (NACK) signal.

The HARQ ACK/NACK signal may be spread to an orthogonal sequence, and an orthogonal sequence index for identifying the orthogonal sequence may be determined on the basis of the resource index.

The reference signal may be transmitted in a first orthogonal frequency division multiplexing (OFDM) symbol and a second OFDM symbol.

In another aspect, a user equipment for transmitting a reference signal in a wireless communication system includes a radio frequency (RF) unit for transmitting and receiving a radio signal and a processor operatively coupled to the RF unit and configured to generate a length-12 base sequence for the reference signal, determine a cyclic shift index selected from a cyclic shift index set {0, 3, 6, 8, 10}, generate a cyclically shifted sequence by cyclically shifting the base sequence on the basis of the cyclic shift index; and transmit the cyclically shifted sequence to a base station.

It is proposed that a physical uplink control channel (PUCCH) structure having increased channel capacity and a structure of a reference signal for the PUCCH. Control information having a greater number of bits can be transmitted, and signaling used to configure the PUCCH can be minimized.

DETAILED DESCRIPTION OF THE EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved node-B (eNB), a base transceiver system (BTS), an access point, etc.

Figure 1:
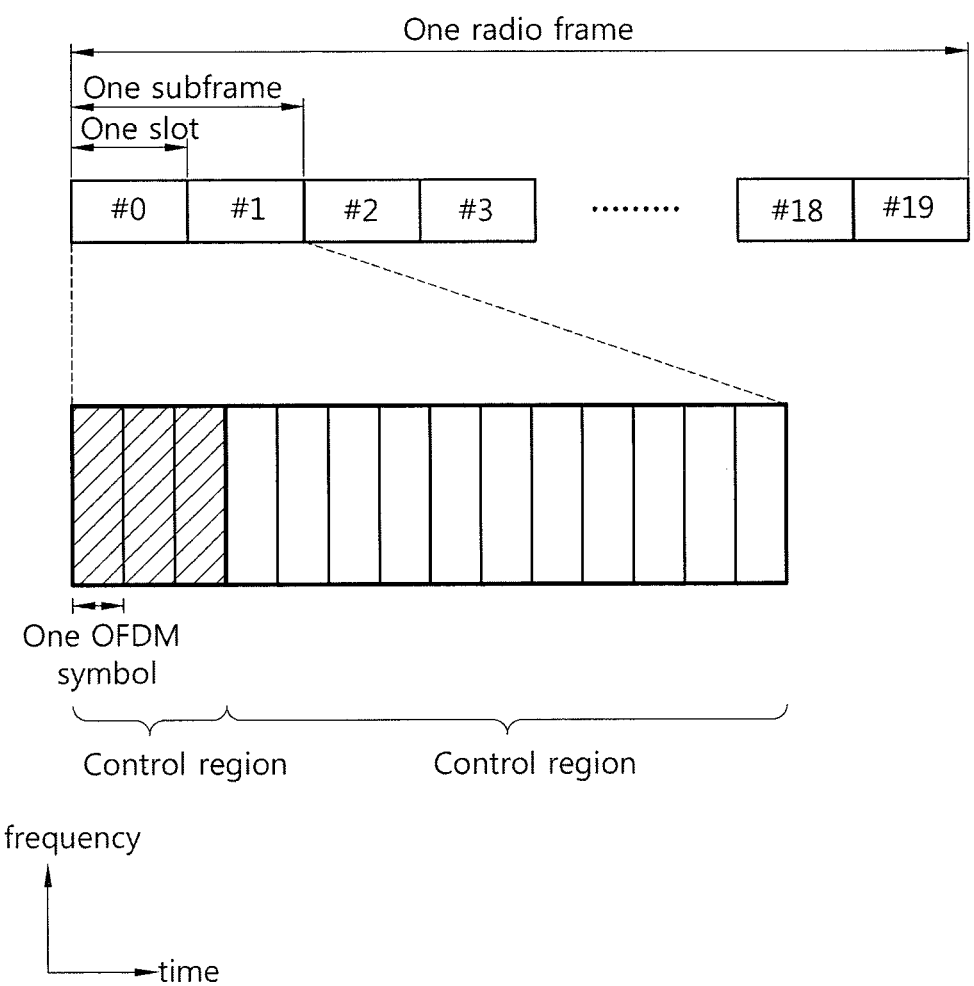
FIG. 1 shows a downlink radio frame structure in 3rd generation partnership project (3GPP) long term evolution (LTE).

FIG. 1 shows a downlink radio frame structure in 3rd generation partnership project (3GPP) long term evolution (LTE). The section 6 of 3GPP TS 36.211 V8.7.0 (2009-05) "Evolved Universal Terrestrial Radio Access (E-UTRA); Physical Channels and Modulation (Release 8)" may be incorporated herein by reference.

A radio frame consists of 20 slots indexed with 0 to 19. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to three preceding OFDM symbols of a 1st slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. A UE first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing cyclic redundancy check (CRC) error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

Figure 2:
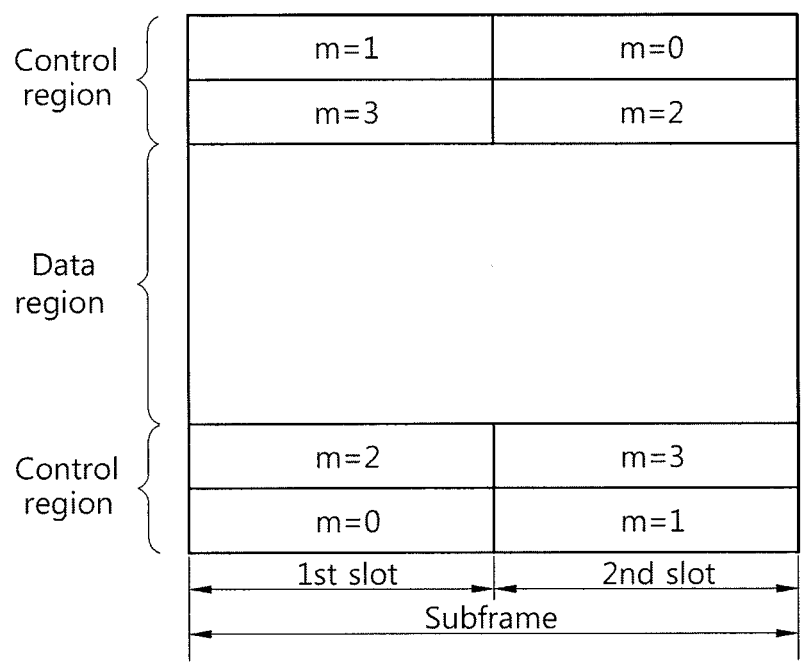
FIG. 2 shows an example of an uplink subframe in 3GPP LTE.

FIG. 2 shows an example of a UL subframe in 3GPP LTE.

The UL subframe can be divided into a control region and a data region. The control region is a region to which a physical uplink control channel (PUCCH) carrying UL control information is assigned. The data region is a region to which a physical uplink shared channel (PUSCH) carrying user data is assigned.

The PUCCH is allocated in an RB pair in a subframe. RBs belonging to the RB pair occupy different subcarriers in each of a 1st slot and a 2nd slot. m is a location index indicating a logical frequency-domain location of the RB pair allocated to the PUCCH in the subframe. It shows that RBs having the same value m occupy different subcarriers in the two slots.

According to 3GPP TS 36.211 V8.7.0, the PUCCH supports multiple formats. A PUCCH having a different number of bits per subframe can be used according to a modulation scheme which is dependent on the PUCCH format.

Table 1 below shows an example of a modulation scheme and the number of bits per subframe according to the PUCCH format.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence ru(n) is defined by Equation 1 below.

$$r_u(n) = e^{jb(n)\pi/4}$$ [Equation 1]

In Equation 1, u denotes a root index, and n denotes a component index in the range of 0≤n≤N−1 where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 2 below to generate a cyclically shifted sequence r(n, Ics).

$$r(n, I_{cs}) = r(n) \cdot \exp\left(\frac{j2\pi I_{cs} n}{N}\right), 0 \leq I_{cs} \leq N-1$$ [Equation 2]

In Equation 2, Ics denotes a CS index indicating a CS amount (0≤Ics≤N−1).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in PUCCH formats 1a/1b will be described.

Figure 3:
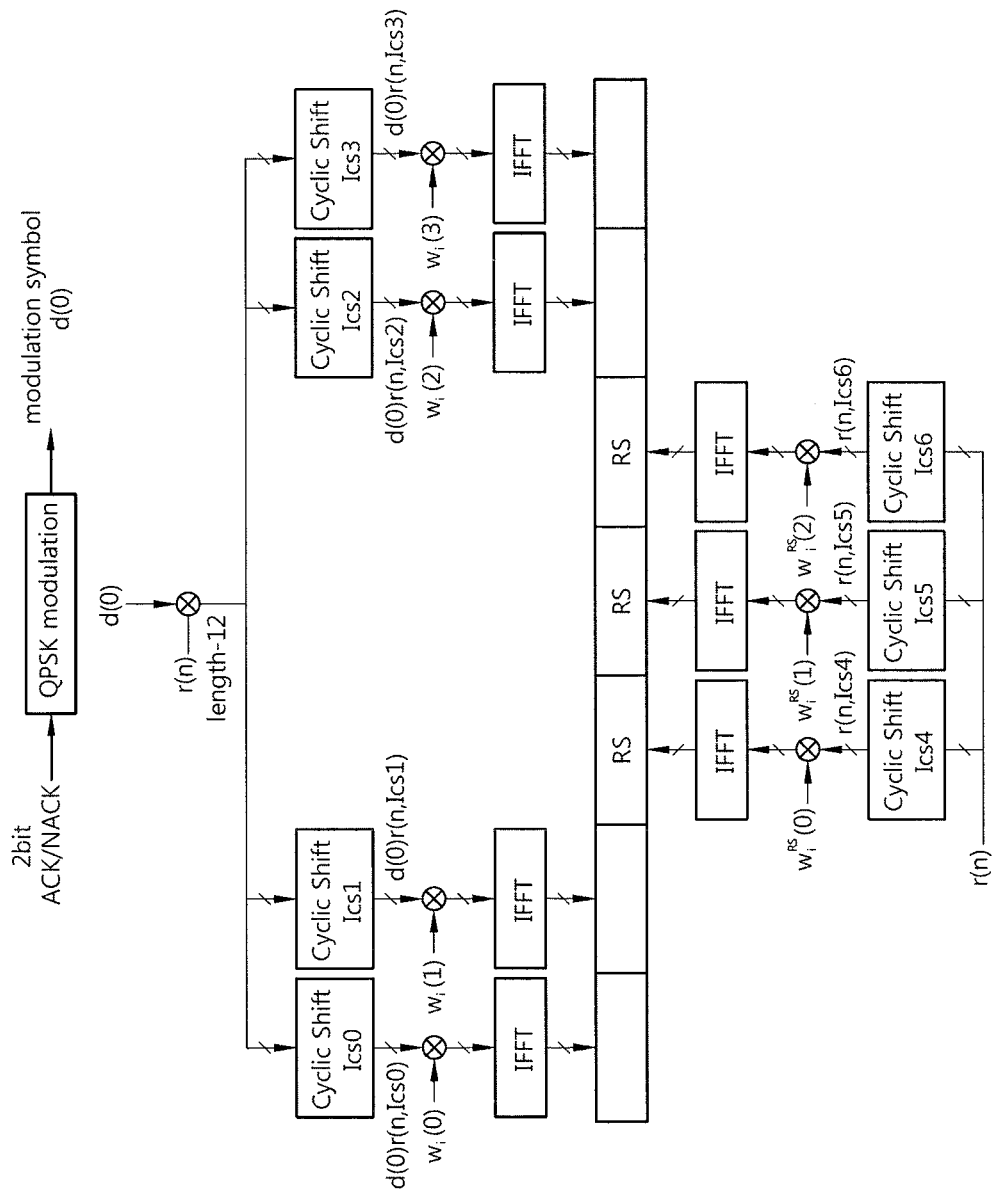
FIG. 3 shows a physical uplink control channel (PUCCH) format 1b in a normal cyclic prefix (CP) in 3GPP LTE.

FIG. 3 shows a PUCCH format 1b in a normal CP in 3GPP LTE. One slot includes 7 OFDM symbols. Three OFDM symbols are used as reference signal (RS) OFDM symbols for a reference signal. Four OFM symbols are used as data OFDM symbols for an ACK/NACK signal.

In the PUCCH format 1b, a modulation symbol d(0) is generated by modulating a 2-bit ACK/NACK signal based on quadrature phase shift keying (QPSK).

A CS index Ics may vary depending on a slot number ns in a radio frame and/or a symbol index 1 in a slot.

In the normal CP, there are four data symbols for transmission of an ACK/NACK signal in one slot. It is assumed that CS indices mapped to the respective data OFDM symbols are denoted by Ics0, Ics1, Ics2, and Ics3.

The modulation symbol d(0) is spread to a cyclically shifted sequence r(n,Ics). When a one-dimensionally spread sequence mapped to an (i+1)th OFDM symbol in a subframe is denoted by m(i), it can be expressed as follows.

{m(0), m(1), m(2), m(3)}={d(0)r(n,Ics0), d(0)r(n,Ics1), d(0)r(n,Ics2), d(0)r(n,Ics3)}

In order to increase UE capacity, the one-dimensionally spread sequence can be spread by using an orthogonal sequence. An orthogonal sequence wi(k) (where i is a sequence index, 0≤k≤K−1) having a spread factor K=4 uses the following sequence.

TABLE 2

| Index (i) | [w$_i$(0), w$_i$(1), w$_i$(2), w$_i$(3)] |
|---|---|
| 0 | [+1, +1, +1, +1] |
| 1 | [+1, −1, +1, −1] |
| 2 | [+1, −1, −1, +1] |

An orthogonal sequence wi(k) (where i is a sequence index, 0≤k≤K−1) having a spread factor K=3 uses the following sequence.

TABLE 3

| Index (i) | [w$_i$(0), w$_i$(1), w$_i$(2)] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, a two-dimensionally spread sequences {s(0), s(1), s(2), s(3)} can be expressed as follows.

{s(0), s(1), s(2), s(3)}={wi(0)m(0), wi(1)m(1), wi(2)m(2), wi(3)m(3)}

The two-dimensionally spread sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal for the PUCCH format 1b is also transmitted by cyclically shifting the base sequence r(n) and then by spreading it by the use of an orthogonal sequence. When CS indices mapped to three RS OFDM symbols are denoted by Ics4, Ics5, and Ics6, three cyclically shifted sequences r(n,Ics4), r(n,Ics5), and r(n,Ics6) can be obtained. The three cyclically shifted sequences are spread by the use of an orthogonal sequence wRSi(k) having a spreading factor K=3.

An orthogonal sequence index i, a CS index Ics, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index n(1)PUUCH is defined in order for the UE to obtain the three parameters for configuring the PUCCH. The resource index n(1)PUUCH is defined to nCCE+N(1)PUUCH, where nCCE is an index of a first CCE used for transmission of corresponding DCI (i.e., DL resource allocation used to receive DL data mapped to an ACK/NACK signal), and N(1)PUUCH is a parameter reported by a BS to the UE by using a higher-layer message.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (referred to as an ACK/NACK resource index or a PUCCH index) can be expressed with at least any one of an orthogonal sequence index i, a CS index Ics, a resource block index m, and an index for obtaining the three indices. The ACK/NACK resource may include at least one of an orthogonal sequence, a cyclic shift, a resource block, and a combination thereof.

Figure 4:
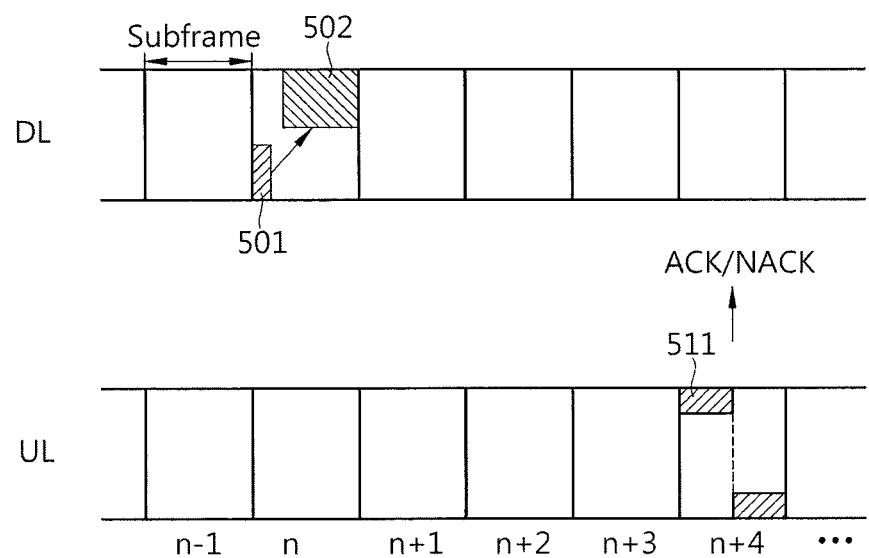
FIG. 4 shows an example of performing hybrid automatic repeat request (HARM).

FIG. 4 shows an example of performing HARQ.

By monitoring a PDCCH, a UE receives a DL resource allocation on a PDCCH 501 in an nth DL subframe. The UE receives a DL transport block through a PDSCH 502 indicated by the DL resource allocation.

The UE transmits an ACK/NACK signal for the DL transport block on a PUCCH 511 in an (n+4)th UL subframe. The ACK/NACK signal can be regarded as a reception acknowledgement for a DL transport block.

The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In the 3GPP LTE, to configure a resource index of the PUCCH 511, the UE uses a resource allocation of the PDCCH 501. That is, a lowest CCE index (or an index of a first CCE) used for transmission of the PDCCH 501 is nCCE, and the resource index is determined as n(1)PUUCH=nCCE+N(1)PUUCH.

Now, the proposed PUCCH structure and the method of performing HARQ by using the PUCCH structure will be described.

Figure 5:
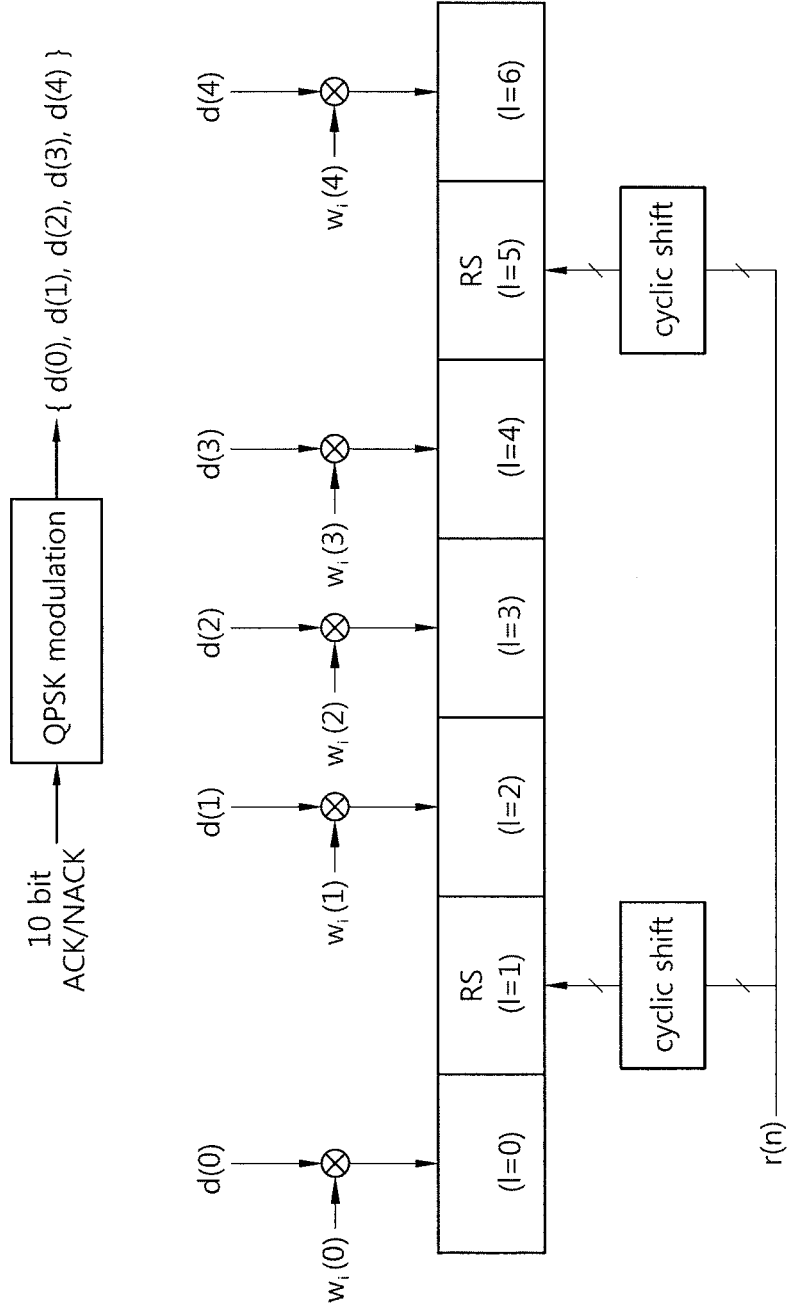
FIG. 5 shows an example of a PUCCH structure according to an embodiment of the present invention.

FIG. 5 shows an example of a PUCCH structure according to an embodiment of the present invention.

One slot includes 7 OFDM symbols. 1 denotes an OFDM symbol number, and has a value in the range of 0 to 6. Two OFDM symbols with l=1, 5 are used as RS OFDM symbols for a reference signal, and the remaining OFDM symbols are used as data OFDM symbols for an ACK/NACK signal.

A symbol sequence {d(0), d(1), d(2), d(3), d(3), d(4)} is generated by performing QPSK modulation on a 10-bit encoded ACK/NACK signal. d(n)(n=0,1,2,3,4) is a complex-valued modulation symbol. The symbol sequence can be regarded as a set of modulation symbols. The number of bits of the ACK/NACK signal or a modulation scheme is for exemplary purposes only, and thus the present invention is not limited thereto.

The symbol sequence is spread with an orthogonal sequence wi. Symbol sequences are mapped to respective data OFDM symbols. An orthogonal sequence is used to identify a PUCCH (or UE) by spreading the symbol sequence across the data OFDM symbols.

The orthogonal sequence has a spreading factor K=5, and includes five elements. As the orthogonal sequence, one of four orthogonal sequences of Table 4 below can be selected according to an orthogonal sequence index i.

TABLE 4

| Index (i) | [$w_i(0)$, $w_i(1)$, $w_i(2)$, $w_i(3)$, $w_i(4)$] |
| --- | --- |
| 0 | [+1, +1, +1, +1, +1] |
| 1 | [+1, $e^{j2\pi/5}$, $e^{j4\pi/5}$, $e^{j6\pi/5}$, $e^{j8\pi/5}$,] |
| 2 | [+1, $e^{j4\pi/5}$, $e^{j8\pi/5}$, $e^{j2\pi/5}$, $e^{j6\pi/5}$,] |
| 3 | [+1, $e^{j6\pi/5}$, $e^{j2\pi/5}$, $e^{j8\pi/5}$, $e^{j4\pi/5}$,] |
| 4 | [+1, $e^{j8\pi/5}$, $e^{j6\pi/5}$, $e^{j4\pi/5}$, $e^{j2\pi/5}$,] |

Two slots in the subframe can use different orthogonal sequence indices.

Each spread symbol sequence is cyclically shifted by a cell-specific CS value ncellcs(ns,1). Each cyclically shifted symbol sequence is transmitted by being mapped to a corresponding data OFDM symbol.

ncellcs(ns,1) is a cell-specific parameter determined by a pseudo-random sequence which is initialized on the basis of a physical cell identity (PCI). ncellcs(ns,1) varies depending on a slot number ns in a radio frame and an OFDM symbol number 1 in a slot.

Two RS OFDM symbols are transmitted by mapping an RS sequence used for demodulation of an ACK/NACK signal.

The RS sequence is acquired by cyclically shifting the base sequence of Equation 1. Since the number of subcarriers per RB is 12, a length of the base sequence N is 12.

As described above, since the ACK/NACK signal is spread with an orthogonal sequence having a spreading factor K=5, up to five UEs can be identified by changing an orthogonal sequence index. This implies that up to five PUCCHs can be multiplexed in the same RB.

Only one RB is used in the PUCCH, and thus the maximum number of available RS sequences is determined by the number of available cyclic shifts and the number of available orthogonal sequences. Since the number of subcarriers per RB is 12, the maximum number of available cyclic shifts is 12. Since the number of RS OFDM symbols is 2, the number of available orthogonal sequences is 2. Therefore, the maximum number of available RS sequences is 24.

It is not necessary to use all of the 24 RS sequences. This is because only 5 UEs can be multiplexed in the PUCCH.

The proposed invention relates to how to select five RS sequences from the 24 RS sequences.

First, it is assumed that two orthogonal sequences are used, and an orthogonal sequence index thereof is iRS. Further, CS values are identified by CS indices 0 to 11.

Figure 6:
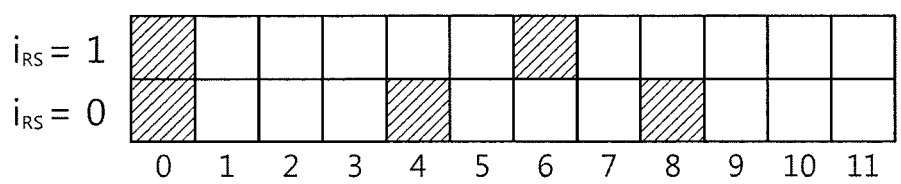
FIG. 6 shows reference signal allocation according to an embodiment of the present invention.
Figure 6:
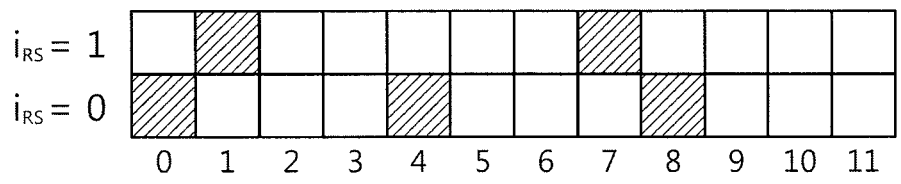

FIG. 6 shows reference signal allocation according to an embodiment of the present invention.

A reference signal is allocated according to the following rule.

(1) Three CS indices and two CS indices have different orthogonal sequence indices. Herein, three CS indices are allocated to iRS=0, and two CS indices are allocated to iRS=1 .

(2) A difference between respective CS indices is maximized in the same orthogonal sequence index.

A sub-figure (A) shows an example in which a difference between CS indices is set to at least 4 with respect to CS indices in iRS=0, and a difference between CS indices is set to at least 6 with respect to CS indices in iRS=1.

In the example of the sub-figure (A), an offset can be given to the CS indices. A sub-figure (B) shows an example in which, while the difference between CS indices is maintained to at least 6 with respect to CS indices in iRS=1, a start point thereof is changed.

Figure 7:
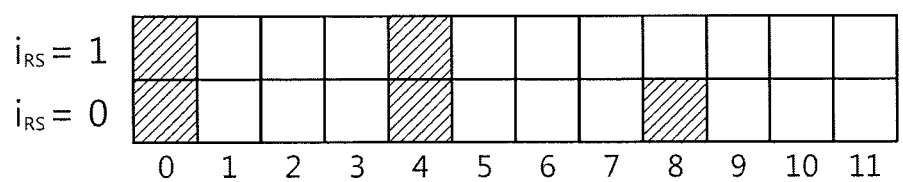
FIG. 7 shows reference signal allocation according to another embodiment of the present invention.
Figure 7:
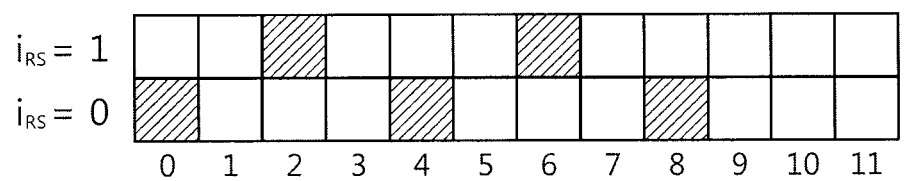

FIG. 7 shows reference signal allocation according to another embodiment of the present invention.

A reference signal is allocated according to the following rule.

(1) Three CS indices and two CS indices have different orthogonal sequence indices. Herein, three CS indices are allocated to iRS=0, and two CS indices are allocated to iRS=1.

(2) A difference between respective CS indices is 4 in the same orthogonal sequence index. A sub-figure (A) shows an example in which a difference between CS indices is set to 4 with respect to CS indices in iRS=0 and iRS=1.

A sub-figure (B) shows an example in which an offset is given to CS indices in the example of the sub-figure (A).

Figure 8:
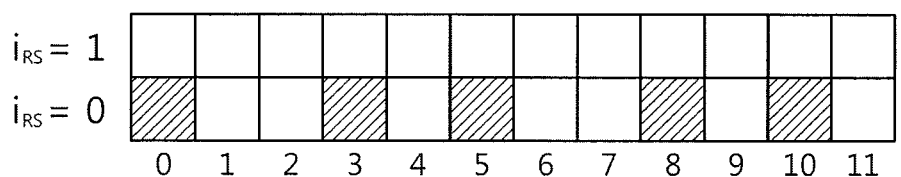
FIG. 8 shows reference signal allocation according to another embodiment of the present invention.
Figure 8:
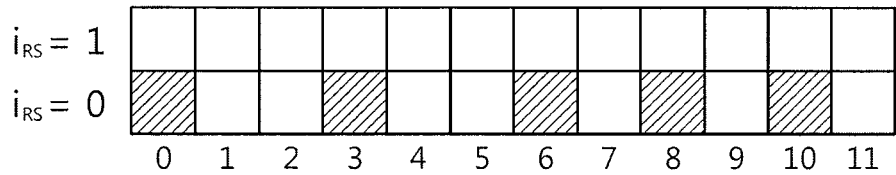
Figure 8:
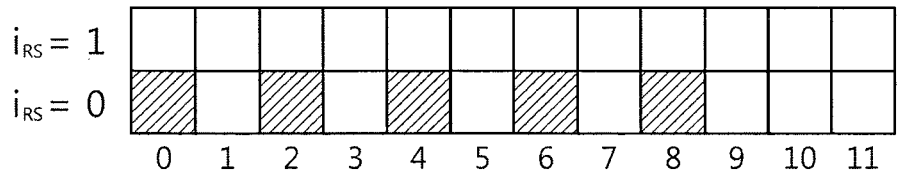

FIG. 8 shows reference signal allocation according to another embodiment of the present invention.

A reference signal is allocated according to the following rule.

(1) Five CS indices have the same orthogonal sequence index. That is, only one orthogonal sequence index can be used. Herein, five CS indices are allocated to iRS=0. For example, the orthogonal sequence may be [1 1].

(2) A difference between respective CS indices is at least 2.

A sub-figure (A) shows a selected CS index set {0, 3, 5, 8, 10}. A sub-figure (B) shows a selected CS index set {0, 3, 6, 8, 10}. A sub-figure (C) shows a selected CS index set {0, 2, 4, 6, 8}.

Considering that 5 CS indices capable of overcoming a path loss or fading can be selected from 12 CS indices, it is proposed to use one orthogonal sequence.

Further, considering that a low CS index is preferably used in general, it is better to have a great difference between the low CS indices.

Therefore, it is proposed to determine a CS index from a CS index set {0, 3, 6, 8, 10} in the proposed embodiments.

It is assumed hereinafter that a reference signal is spread with one orthogonal sequence, and a CS index is determined from the CS index set {0, 3, 6, 8, 10}.

Returning to FIG. 5, assume that Ics denotes a determined CS index. The Ics is selected from the CS index set {0, 3, 6, 8, 10}.

A cyclically shifted sequence is generated by cyclically shifting a base sequence on the basis of the Ics. The cyclically shifted sequence is transmitted by being mapped to each RS OFDM symbol.

The Ics to be applied may differ for each RS OFDM symbol. For example, a UE may determine a first CS index Ics(1)={ncellcs(ns,1)+Ics} mod N with respect to an RS OFDM symbol with l=1, and may determine a second CS index Ics(5)={ncellcs(ns,1)+Ics} mod N with respect to an RS OFDM symbol with l=5.

Figure 9:
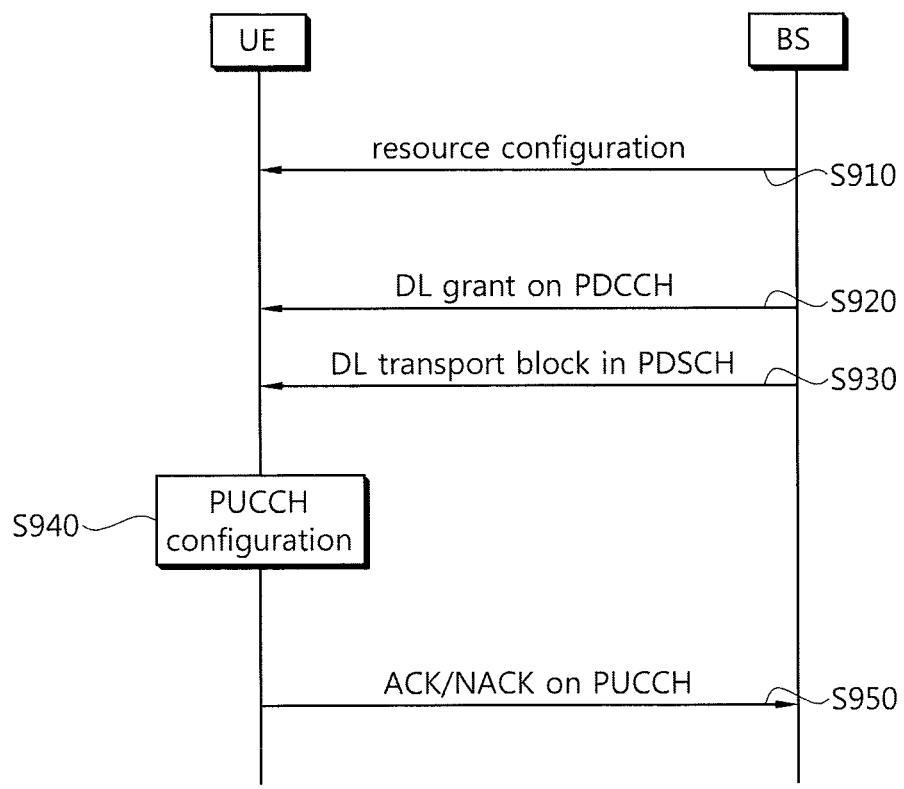
FIG. 9 and FIG. 10 are flowcharts showing a method of transmitting a reference signal according to an embodiment of the present invention.

FIG. 9 is a flowchart showing a method of performing HARQ according to an embodiment of the present invention. This is a process of performing HARQ on the basis of the PUCCH structure according to the embodiment of FIG. 5.

A BS transmits a resource configuration to a UE (step S910). The resource configuration can be transmitted by using a radio resource control (RRC) message for configuring/modification/reconfiguration of a radio bearer.

The resource configuration includes information regarding a plurality of resource index candidates. The plurality of resource index candidates may be a set of resource indices that can be configured to the UE. The resource configuration may include information regarding four resource index candidates.

The BS transmits a DL grant to the UE through a PDCCH (step S920). The DL grant includes a DL resource allocation and a resource index field. The DL resource allocation includes resource allocation information indicating a PDSCH. The resource index field indicates a resource index used to configure a PUCCH among the plurality of resource index candidates. If there are four resource index candidates, the resource index field may have two bits.

The UE receives a DL transport block through a PDSCH on the basis of the DL resource allocation (step S930). The UE generates an HARQ ACK/NACK signal for the DL transport block.

The UE configures the PUCCH on the basis of a resource index (step S940). In the structure of FIG. 5, a PUCCH resource includes an orthogonal sequence index used to spread the ACK/NACK signal and a CS index for a reference signal.

The orthogonal sequence index used to spread the ACK/NACK signal can be obtained as follows.

$$i_1 = n_{PUCCH} \bmod N_{SF}, \quad i_2 = 3i_1 \bmod N_{SF} \qquad [\text{Equation 3}]$$

Herein, $i_1$ is an orthogonal sequence index used in a first slot, $i_2$ is an orthogonal sequence index used in a second slot, NSF is a spreading factor of an orthogonal sequence, and nPUCCH is a resource index.

Since the PUCCH is transmitted in one subframe, that is, in two slots, two orthogonal sequence indices are determined. Since one slot includes five data OFDM symbols, NSF is 5.

A CS index Ics for a reference signal is selected from a CS index set {10, 3, 6, 8, 10}. More specifically, a relationship between the orthogonal sequence index and the CS index Ics can be defined by Table 5 below.

TABLE 5

| $i_1$ or $i_2$ | Ics |
|---|---|
| 0 | 0 |
| 1 | 3 |
| 2 | 6 |
| 3 | 8 |
| 4 | 10 |

That is, the orthogonal sequence index and the CS index can be 1:1 mapped.

A cyclic shift for two RS OFDM symbols is obtained on the basis of the CS index. For example, the UE may determine a first CS index Ics(1)={ncellcs(ns,1)+Ics} mod N with respect to an RS OFDM symbol with l=1, and may determine a second CS index Ics(5)={ncellcs(ns,1)+Ics} mod N with respect to an RS OFDM symbol with l=5.

The UE determines a PUCCH resource on the basis of a resource index nPUCCH, and configures a PUCCH having the same structure of FIG. 5.

The UE transmits an ACK/NACK signal through the PUCCH (step S950).

Figure 10:
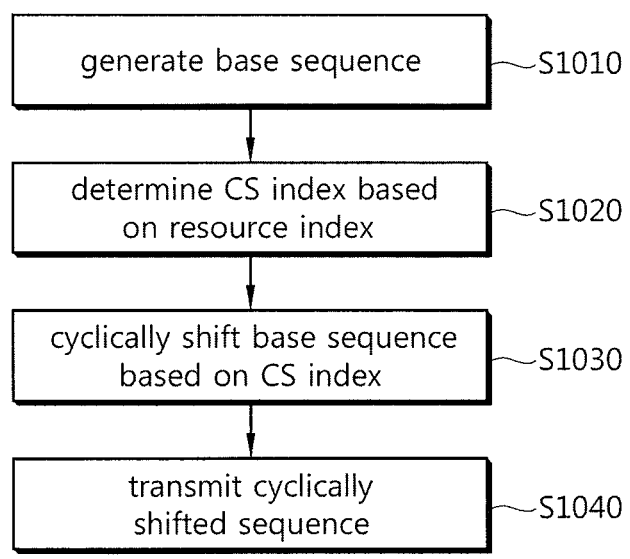

FIG. 10 is a flowchart showing a method of transmitting a reference signal according to an embodiment of the present invention. This is a process of transmitting the reference signal on the basis of a PUCCH structure according to the embodiment of FIG. 5.

A UE generates a base sequence (step S1010). According to Equation 1, the UE generates a base sequence with a length N=12.

The UE determines a CS index on the basis of a resource index (step S1020). The resource index can be transmitted by a BS by being included in a DL grant. As shown in step S940 of FIG. 9 described above, the UE can select one CS index Ics from a CS index set {0, 3, 6, 8, 10} on the basis of the resource index.

The UE cyclically shifts a base sequence on the basis of the selected CS index (step S1030).

The UE transmits the cyclically shifted sequence (step S1040).

Figure 11:
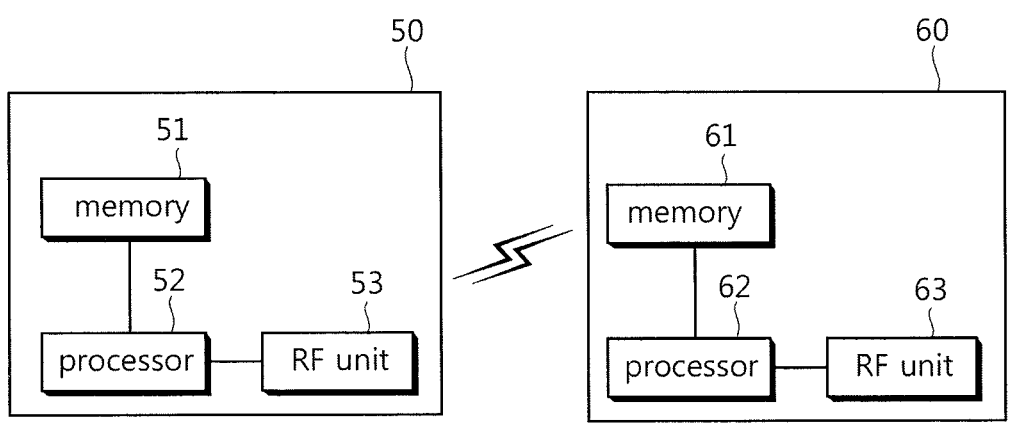
FIG. 11 is a block diagram showing a wireless communication system for implementing an embodiment of the present invention.

FIG. 11 is a block diagram showing a wireless communication system for implementing an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, processes and/or methods. The processor 51 can implement the operation of the BS 50 according to the embodiments of FIG. 9 and FIG. 10.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, processes and/or methods. The processor 61 can implement the operation of the UE 60 according to the embodiments of FIG. 9 and FIG. 10.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a reference signal in a wireless communication system, the method comprising:
   selecting one or more values among a set {10, 3, 6, 8, 10};
   cyclically shifting a base sequence based on the one or more values selected from the set {10, 3, 6, 8, 10}; and
   transmitting the reference signal based on the cyclically shifted base sequence to a base station,
   wherein the reference signal is transmitted on a first orthogonal frequency division multiplexing (OFDM) symbol and a second OFDM symbol,
   wherein the first OFDM symbol is a second OFDM symbol among 7 OFDM symbols in one slot, and
   wherein the second OFDM symbol is a sixth OFDM symbol among the 7 OFDM symbols in the slot.

2. The method of claim 1, further comprising:
   generating the base sequence for the reference signal.

3. The method of claim 1, further comprising:
   receiving, from the base station, a resource configuration including information regarding a plurality of resource candidates.

4. The method of claim 3, further comprising:
   receiving, from the base station, information indicating a resource index among the plurality of resource candidates; and
   determining a cyclic shift index according to the resource index.

5. The method of claim 4, wherein the reference signal is used to demodulate a hybrid automatic repeat request (HARQ) positive-acknowledgement (ACK)/negative-acknowledgement (NACK) signal.

6. The method of claim 5, wherein the HARQ ACK/NACK signal is spread to an orthogonal sequence, and
   wherein an orthogonal sequence index for identifying the orthogonal sequence is determined on the basis of the resource index.

7. A user equipment for transmitting a reference signal in a wireless communication system, the user equipment comprising:
   a transceiver configured to transmit and receive a radio signal; and
   a processor operatively coupled to the transceiver and configured to:
   select one or more values among a set {0, 3, 6, 8, 10},
   cyclically shift a base sequence based on the one or more values selected from the set {0, 3, 6, 8, 10}, and
   transmit the reference signal based on the cyclically shifted base sequence to a base station,
   wherein the reference signal is transmitted on a first orthogonal frequency division multiplexing (OFDM) symbol and a second OFDM symbol,
   wherein the first OFDM symbol is a second OFDM symbol among 7 OFDM symbols in one slot, and
   wherein the second OFDM symbol is a sixth OFDM symbol among the 7 OFDM symbols in the slot.

8. The user equipment of claim 7, wherein the processor is further configured to generate the base sequence for the reference signal.

9. The user equipment of claim 7, wherein the processor is further configured to receive, from the base station, a resource configuration including information regarding a plurality of resource candidates.

10. The user equipment of claim 7, wherein the processor is further configured to:
    receive, from the base station, information indicating a resource index among the plurality of resource candidates, and determine a cyclic shift index according to the resource index.

11. The user equipment of claim 10, wherein the reference signal is used to demodulate a hybrid automatic repeat request (HARQ) positive-acknowledgement (ACK)/negative-acknowledgement (NACK) signal.

12. The user equipment of claim 11, wherein the HARQ ACK/NACK signal is spread to an orthogonal sequence, and wherein an orthogonal sequence index for identifying the orthogonal sequence is determined on the basis of the resource index.

* * * * *

UNITED STATES PATENT AND TRADEMARK OFFICE
CERTIFICATE OF CORRECTION

PATENT NO. : 9,438,403 B2
APPLICATION NO. : 14/728770
DATED : September 6, 2016
INVENTOR(S) : Min Gyu Kim et al.

Page 1 of 1

It is certified that error appears in the above-identified patent and that said Letters Patent is hereby corrected as shown below:

In the Claims

Claim 1,

Column 12, Line 4:
Replace "{10, 3, 6, 8,10}" with -- {0, 3, 6, 8, 10} --.

Column 12, Line 6:
Replace "{10, 3, 6, 8,10}" with -- {0, 3, 6, 8, 10} --.

Signed and Sealed this
Sixteenth Day of June, 2020

Andrei Iancu
*Director of the United States Patent and Trademark Office*